(12) United States Patent
Ljung

(10) Patent No.: US 10,397,664 B2
(45) Date of Patent: Aug. 27, 2019

(54) METHOD FOR OPERATING A MOBILE DEVICE

(71) Applicant: Sony Corporation, Tokyo (JP)

(72) Inventor: Rickard Ljung, Helsingborg (SE)

(73) Assignee: SONY CORPORATION, Tokyo (JP)

( * ) Notice: Subject to any disclaimer, the term of this patent is extended or adjusted under 35 U.S.C. 154(b) by 287 days.

(21) Appl. No.: 14/402,404

(22) PCT Filed: Jan. 10, 2014

(86) PCT No.: PCT/IB2014/000016
§ 371 (c)(1),
(2) Date: Nov. 20, 2014

(87) PCT Pub. No.: WO2015/104570
PCT Pub. Date: Jul. 16, 2015

(65) Prior Publication Data
US 2016/0309241 A1     Oct. 20, 2016

(51) Int. Cl.
*H04N 7/173* (2011.01)
*H04N 21/845* (2011.01)
(Continued)

(52) U.S. Cl.
CPC ..... *H04N 21/8456* (2013.01); *H04L 65/4084* (2013.01); *H04L 65/4092* (2013.01);
(Continued)

(58) Field of Classification Search
CPC ........... H04N 21/8456; H04N 21/2387; H04N 21/44004; H04N 21/6373; H04N 21/6131; H04N 21/4621; H04N 21/2662
(Continued)

(56) References Cited

U.S. PATENT DOCUMENTS 9,277,290 B2 *   3/2016   Song .............. H04L 27/02
9,432,433 B2 *   8/2016   Luby .............. H04N 21/23106
(Continued)

FOREIGN PATENT DOCUMENTS

WO           2013000489        1/2013
WO     WO 2013/000489 A1       1/2013
(Continued)

OTHER PUBLICATIONS

InterDigital Inc, Power Optimization for DASH Clients, Nov. 2012, Tdoc S4-121287 (Year: 2012).*
(Continued)

*Primary Examiner* — Pankaj Kumar
*Assistant Examiner* — Sahar Aqil Riaz
(74) *Attorney, Agent, or Firm* — Renner, Otto, Boisselle & Sklar, LLP

(57) ABSTRACT

The present invention relates to a method (20) for operating a mobile device (10). The mobile device (10) is configured to download a media stream comprising a plurality of data segments (S1-Sn) and to playback the media stream during download. The media stream is downloaded as a plurality of blocks of data segments and each block of data segments comprises a set of the plurality of data segments (S1-Sn) representing a corresponding media stream portion of the media stream. According to the method, a required playback time (T) for a next block of data segments to be downloaded is determined depending on a predetermined required minimum playback time (C) which defines a required minimum time duration for playing back the media stream portion provided by the next block of data segments.

10 Claims, 1 Drawing Sheet

(51) Int. Cl.
*H04L 29/06* (2006.01)
*H04N 21/2343* (2011.01)
*H04N 21/44* (2011.01)
*H04N 21/443* (2011.01)
*H04N 21/6373* (2011.01)
*H04N 21/414* (2011.01)
*H04N 21/61* (2011.01)
*H04W 52/02* (2009.01)
*H04N 21/2662* (2011.01)
*H04N 21/2387* (2011.01)
*H04N 21/462* (2011.01)

(52) U.S. Cl.
CPC ....... *H04L 65/80* (2013.01); *H04N 21/23439* (2013.01); *H04N 21/41407* (2013.01); *H04N 21/44004* (2013.01); *H04N 21/4436* (2013.01); *H04N 21/6131* (2013.01); *H04N 21/6373* (2013.01); *H04W 52/0209* (2013.01); *H04N 21/2387* (2013.01); *H04N 21/2662* (2013.01); *H04N 21/4621* (2013.01); *Y02D 70/1242* (2018.01); *Y02D 70/1262* (2018.01); *Y02D 70/142* (2018.01)

(58) Field of Classification Search
USPC .......................................................... 725/94
See application file for complete search history.

(56) References Cited

U.S. PATENT DOCUMENTS

2011/0099302 A1* 4/2011 Ozeki ................ H04N 5/23241
710/33
2012/0004960 A1* 1/2012 Ma ..................... G06Q 30/0241
705/14.4
2014/0079126 A1* 3/2014 Ye ........................ H04N 19/105
375/240.16
2015/0009816 A1* 1/2015 Hsu ................... H04W 28/0221
370/230.1

FOREIGN PATENT DOCUMENTS

WO         2013072080       5/2013
WO    WO 2013/072080 A1    5/2013

OTHER PUBLICATIONS

International Search Report and Written Opinion from corresponding International Application No. PCT/IB2014/000016, dated Sep. 4, 2014.

"Preliminary WD of Green MPEG", 105. MPEG Meeting: Jul. 7, 2013-Aug. 2, 2013; Vienna (Motion Picture Expert Group or ISO/IEC JTC1/SC29/WG11), No. N13719, Aug. 2, 2013, XP030020467, whole document.

Office Action for corresponding European Application No. 14704885.4, dated Feb. 14, 2018.

Interdigital Inc; "Power Optimization for DASH Clients", 3GPP Draft; S4-121287 Power Optimization for Dash Clietns, 3$^{rd}$ Generation Partnership Project (3GPP), Mobile Competence Centre; 650, Route Des Lucioles; F-06921 Sophia-Antipolis Cedex; France, vol. SA WG4, No. Bratislava, Slovakia; Nov. 5, 2012-Nov. 9, 2012 Oct. 31, 2012, XP050687106, Retrieved form the Internet: URL: hhtp://www.3gpp.org/ftp/tsg_sa/WG4_CODEC/TSGS4_71/Docs/.

* cited by examiner

METHOD FOR OPERATING A MOBILE DEVICE

FIELD OF THE INVENTION

The present invention relates to a method for operating a mobile device, especially a method for downloading a media stream from for example a server to the mobile device. The present invention relates furthermore to a mobile device configured to perform the method of the present invention.

BACKGROUND OF THE INVENTION

Media streaming, for example video streaming or audio streaming, is a common use case for mobile devices, for example mobile telephones, especially so-called smartphones, mobile music players and mobile video players. As a radio link quality between a server providing media data and the mobile device may vary, adaptive streaming methods like MPEG-DASH and HTTP live streaming (HLS) may be used. These methods adapt the video codec data rates used for the transmission of the media streaming to the available radio link quality. This is conducted by means of selecting suitable variants of the required media content, where the different variants have different encodings. Each variant is downloaded as a segment, corresponding to a few seconds of playback time of the media stream, for example 5 to 10 seconds. In other words, the adapted streaming works by breaking the content of a media file into a sequence of small file segments, each segment containing a short interval of playback time of a content that is potentially much longer, for example many hours in duration. The content of the media file may contain a movie, music or a live broadcast. The content is made available at a variety of different bit rates such as alternative segments encoded at different bit rates covering aligned short intervals of playback time are made available. As the content is played back by a user equipment, for example a mobile device, the user equipment automatically selects from the alternatives the next segment to download and play back based on current network conditions. The user equipment may select the segment with the highest bit rate possible that can be downloaded in time for playback without causing stalling events or rebuffering events in the playback. Thus, the user equipment can seamlessly adapt to changing network conditions and may provide high quality playback without stalling or rebuffering events.

However, during the above-described dynamic adapted streaming, a receiver unit of the user equipment may be used more or less continuously resulting in a large power consumption which may affect the operating time of a battery-powered mobile device. Therefore, there is a need to improve media streaming in mobile devices with respect to power consumption and battery lifetime.

SUMMARY OF THE INVENTION

According to the present invention, this object is achieved by a method for operating a mobile device as defined in claim 1, and a mobile device as defined in claim 9. The dependent claims define preferred and advantageous embodiments of the invention.

According to the present invention, a method for operating a mobile device, for example a mobile telephone, is provided. The mobile device is configured to download a media stream comprising a plurality of data segments and to playback the media stream during download. The media stream is downloaded as a plurality of blocks of data segments, and each block of data segments comprises a set of the plurality of data segments representing a corresponding media stream portion of the media stream. In other words, the mobile device is configured to download a media stream according to the above-described dynamic adaptive streaming, for example via a dynamic adaptive streaming over HTTP (DASH) which is also known as MPEG-DASH. The data segments may be provided at a server to which the mobile device is connected via for example a wireless data communication. Each or at least some of the data segments are available at a variety of different bit rates or encodings such that the mobile device may select for downloading a media stream portion selectively a data segment having a large data volume and providing a high quality or a data segment having a lower data volume and providing a lower quality. According to the method, a required playback time for a next block of data segments to be downloaded is determined depending on a predetermined required minimum playback time. The predetermined required minimum playback time defines a required minimum time duration for playing back the media stream portion provided by the next block of data segments. After determining the required playback time for the next block of data segments to be downloaded, a download of a block of data segments having the determined required playback time may be requested.

For avoiding that a media stream is stalled or interrupted during playback, a device using the above-described dynamic adaptive streaming commonly selects a bit rate and quality of a next data segment to be downloaded such that the time for the download is shorter than the time for playing back the content of the downloaded data segment. However, the gaps between two downloads of data segments or blocks of data segments may be relatively short such that a receiver unit of the mobile device is continuously in an active state, for example due to required inactivity times before switching from an active mode to an idle mode. Therefore, power consumption may be considerably high. By determining the required playback time for the next block of data segments depending on the predetermined required minimum playback time, a gap between a download of the next block of data segments and a download of the block after the next block may be long enough for powering down the receiver unit during the gap. Therefore, an active time of the receiver unit may be reduced and therefore a power consumption of the mobile device may be reduced resulting in a longer battery lifetime.

According to an embodiment, the required minimum playback time is determined based on an inactivity timer value which has been configured for the receiver unit of the mobile device which performs the download of the media stream. The inactivity timer value controls the transition of the receiver unit between a first mode and a second mode. A power consumption of the receiver unit in the first mode is higher than in the second mode. The inactivity timer may comprise for example an RRC (Radio Resource Control) inactivity timer defined in a WCDMA (Wide Band Code Division Multiple Access) network. The first mode may comprise for example an active mode and the second mode may comprise for example an idle mode. The required playback time for the next block of data segments to be downloaded may be determined such that a time difference between the playback time of the media stream portion of the next block of data segments and the expected download time for downloading the next block of data segments is larger than the inactivity timer value. Hence, the receiver unit may automatically switch into the idle mode for at least some time between two consecutive downloads of the data segment blocks of the media stream. The inactivity timer value may control a RRC inactivity timer of the receiver unit and may be configured by a network control layer of the communication network in which the mobile device is operated.

According to an embodiment, a recent playback time of a block of data segments which has been downloaded recently is determined and the required playback time for the next block of data segments to be downloaded is determined depending on the recent playback time. Furthermore, a recent download time required for downloading a block of data segments which has been downloaded recently may be determined and the required playback time for the next block of data segments to be downloaded may be determined depending on the recent download time. The terms "recent" and "recently" refer in the context of the present description to a block of data segments which has been downloaded just before the next block of data segments is to be downloaded. However, according to another embodiment, the terms "recent" and "recently" may refer to a block of data segments which has been downloaded at an earlier point in time, for example such that one, two or three other blocks of data segments have been downloaded between the recently downloaded block of data segments and the next block of data segments to be downloaded.

When the required playback time for the next block of data segments is determined based on the predetermined required minimum playback time as described above, the blocks of data segments may be larger than they would be in a conventional dynamic adaptive streaming, and therefore the risk of the media stream being stalled during playback may increase. By determining the required playback time for the next block of data segments additionally depending on the recent playback time and furthermore depending on the recent download time, a dynamic behavior of the method may be increased such that the media stream playback may be protected from being stalled or interrupted or a rebuffering is required. For example, the required playback time for the next block of data segments to be downloaded may be determined by determining a ratio of the recent playback time to the recent download time, and by setting selectively, based on the determined ratio, the required playback time for the next block of data segments to be downloaded to either the predetermined required minimum playback time or to a maximum of the predetermined required minimum playback time and a time derived from a reduction of the recent playback time. When, for example, the ratio of the recent playback time to the recent download time is larger than a predetermined maximum target value, there is currently no danger of the media playback to be stalled and therefore the required minimum playback time recently used may be used again for the next download or may be even increased. However, when the ratio is lower than this predetermined maximum target value, the ratio may be compared with another threshold defining a minimum target of ratio of the media playback time of a block of data segments to the download time for the corresponding block of data segments. If the ratio is below this minimum threshold, there is a high risk of the media playback being stalled during streaming and thus the required minimum playback time may be set to the predetermined required minimum playback time. However, when the ratio is not below the minimum threshold, the required playback time for the next block of data segments may comprise the recent playback time reduced by a predetermined factor, for example a factor of 0,5 to 0,9. However, the required playback time for the next block of data segments may be selected such that it has at least the value of the predetermined required minimum playback time to ensure that the receiver unit of the mobile device may reach an idle state between downloads.

According to an embodiment, at least some of the data segments of the media stream are each available in a plurality of different coding formats. In other words, for a single media stream portion, comprising for example a few seconds of the content of the media stream, several alternative segments are available. Each of the segments comprises the same content portion but coded in a different way, for example in different quality levels. Thus, for downloading the alternative segments, different amounts of data are to be transmitted resulting in different bit rates required for transmitting the segments from the server to the mobile device. According to the embodiment, for the next block of data segments to be downloaded, a coding format of the available plurality of different coding formats is selected depending on the recent playback time and the recent download time. For example, if the transmission quality of a radio link to the mobile device is poor, a data segment may be downloaded in a low quality format such that only a small amount of data is to be transmitted and the playback of the media stream is not interrupted or stalled due to the poor transmission quality. When the transmission quality rises, for the next block of data segments to be downloaded a coding format may be selected having a higher quality increasing the video or audio quality of the played back media stream.

According to the present invention, a mobile device is provided comprising a receiver unit for downloading a plurality of data segments of a media stream, an output device for playing back media content of the downloaded media stream to a user, and a processing device. The processing device is configured to download the media stream and to play back the media stream during download. The media stream is downloaded as a plurality of blocks of data segments, wherein each block of data segments comprises a set of the plurality of data segments representing a corresponding media stream portion of the media stream. The processing device is furthermore configured to determine a required playback time for a next block of data segments to be downloaded depending on a predetermined required minimum playback time, which defines a required minimum time duration for playing back the media stream portion provided by the next block of data segments. By downloading at least a block of data segments providing the required minimum time duration for playing back the included media stream portion, downloading gaps between two downloadings of data segment blocks may be sufficiently long enough for the receiver unit to switch into an idle or low power state. This may contribute to reduce power consumption of the mobile device and thus the operating time of the mobile device may be increased.

According to an embodiment, the mobile device is configured to perform the above-described method and comprises therefore also the advantages described above.

The mobile device comprises for example a mobile telephone, a mobile media player, a mobile computer or a mobile tablet computer. Each of the listed devices is usually battery-powered and may take advantage of the above-described method to prolong battery lifetime and thus operating time of the device.

Although specific features described in the above summary and the following detailed description are described in connection with specific embodiments and aspects of the present invention, it should be understood that the features of the exemplary embodiments and aspects may be combined with each other unless specifically noted otherwise.

BRIEF DESCRIPTION OF THE DRAWINGS

The present invention will now be described in more detail with reference to the accompanying drawings.

DETAILED DESCRIPTION OF PREFERRED EMBODIMENTS

In the following, exemplary embodiments of the invention will be described in more detail. It is to be understood that the features of the various exemplary embodiments described herein may be combined with each other unless specifically noted otherwise. Any coupling between components or devices shown in the Figures may be a direct or indirect coupling unless specifically noted otherwise.

Figure 1:
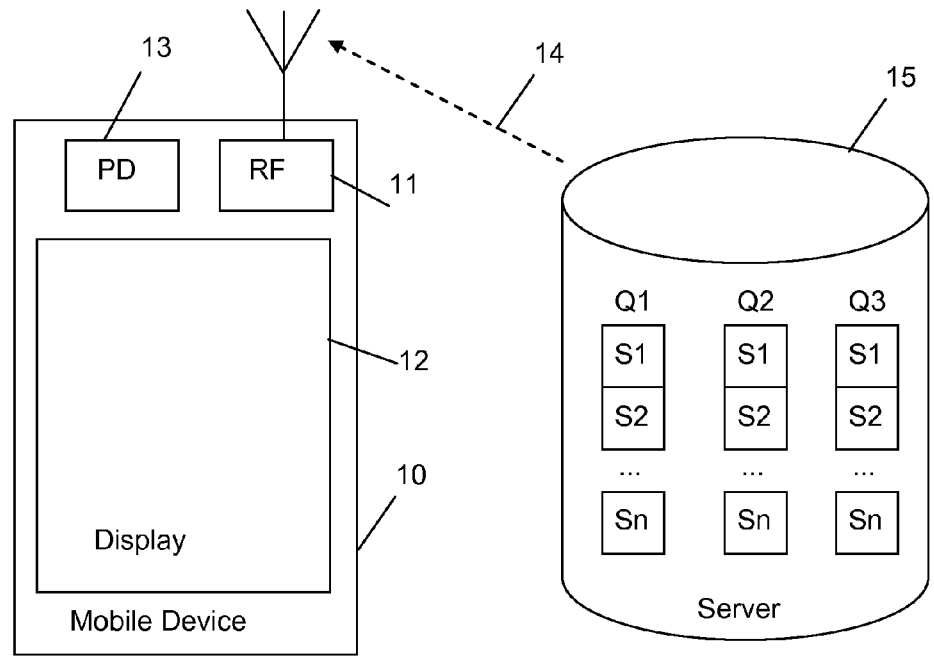
FIG. 1 shows schematically a mobile device according to an embodiment of the present invention in connection with a server providing media data.

FIG. 1 shows a mobile device, for example a mobile phone or a mobile computer, communicating via a radio frequency connection 14 with a server 15. The radio frequency connection 14 may comprise for example a wireless data communication via a wireless telecommunication network according to GSM, UMTS or LTE. However, the wireless radio frequency connection 14 may also comprise a connection via a wireless local area network WLAN. The mobile device 10 comprises a radio frequency receiver unit 11, an output device, for example a display 12, and a processing device 13. The processing device 13 is configured to download media data as a media stream and to playback the media stream during download on the display and/or a (not shown) loudspeaker. The media stream may be downloaded as a plurality of blocks of data segments from the server 15. To enable high quality streaming of media content via a communication channel with varying transmission quality, the mobile device 10 as well as the server 15 are configured to perform a dynamic adaptive streaming like for example a dynamic adaptive streaming over HTTP (DASH), also known as MPEG-DASH. For providing the dynamic adaptive streaming, the media content is broken into a sequence of small data segments, each segment containing a short interval of playback time of the media content. The content is made available at a variety of different qualities. Therefore, alternative data segments encoded at different quality levels covering aligned short intervals of playback time of the content are available at the server 15. In the example shown in FIG. 1, the server 15 provides the media content in three quality levels Q1, Q2 and Q3. In each quality level a plurality of data segments S1, S2, . . . Sn is available. The content of segment S1 in each quality level is the same, whereas due to a different coding an image quality may be different and an amount of data to be downloaded to the mobile device 10 for playing back the content is also different. Assuming that the image quality rises with the quality number, the segments of quality Q1 provide the poorest quality and require therefore the lowest data transmission bit rate at the wireless communication connection 14, whereas the segments of quality Q3 provide the best image quality of the media content and require the largest amount of data to be transferred to the mobile device and thus the highest bit rate to download the media stream in real time. As the content is downloaded to the mobile device 10, the mobile device 10 automatically selects from the alternative qualities the next data segment to download based on for example current network conditions.

Operating of the mobile device 10 for selecting data segments to be downloaded from the server 15 during media streaming and play back will be described in more detail in connection with FIG. 2 in the following.

Figure 2:
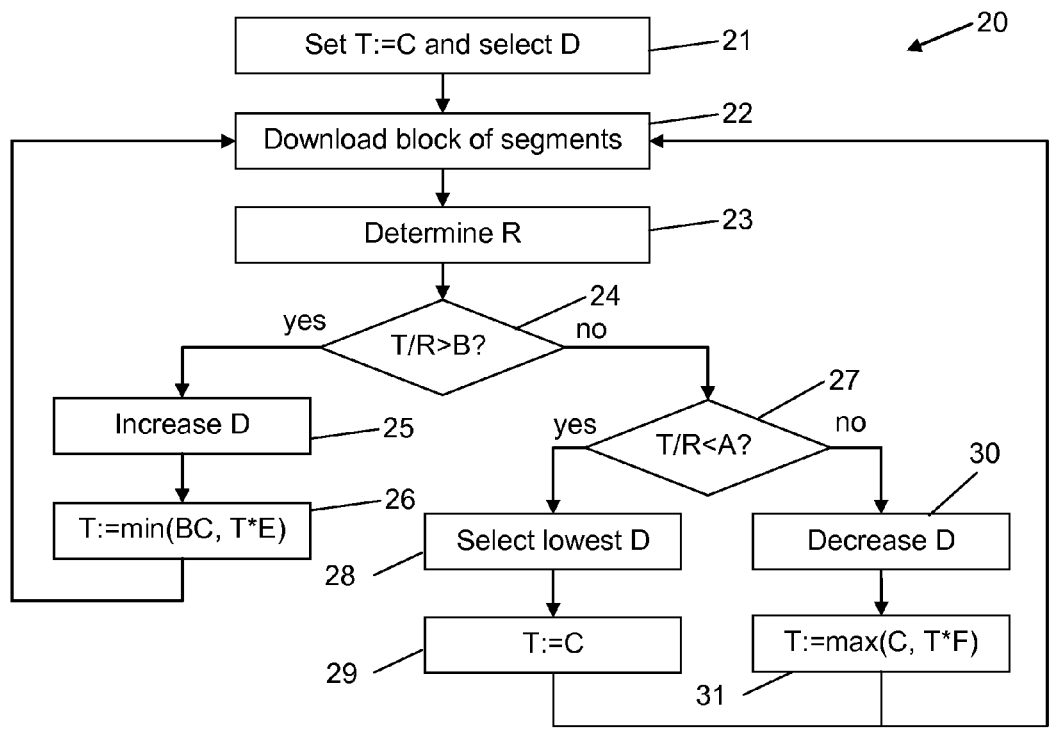
FIG. 2 shows schematically a method for operating a mobile device for downloading a media stream according to an embodiment of the present invention.

FIG. 2 shows a method 20 comprising method steps 21 to 31 performed by the processing device 13 of the mobile device 10. The media streaming, for example a video streaming, described in connection with the method 20 is optimized with respect to the quality of the radio frequency connection 14 as well as to a power consumption of the mobile device 10. In step 21 the download is initiated and a required playback time T for a next block of data segments to be downloaded is set to a predetermined required minimum playback time C which defines a required minimum time duration for playing back the media stream portion provided by the next block of data segments being downloaded. The predetermined required minimum playback time C is defined such that a power consumption efficient usage of the receiver unit 11 may be ensured. For example, the predetermined required minimum playback time C may be defined such that between downloading two blocks of data segments a transmission gap is present which is large enough for the receiver unit 11 to switch at least part of the time into an idle or low power state. The initial selection of a suitable codec or quality D in step 21 may be done in different ways. For example, a radio access technology (RAT) may be taken into account for selecting a suitable quality, since it is expected that, for example, LTE (Long Term Evolution) can offer higher data rates than WCDMA (Wide Band Code Division Multiple Access). In step 22 a first block of data segments with the required playback time T and the quality D is downloaded from the server 15. In step 23 the time R required for downloading the last recently requested block of data segments in step 22 is determined. In step 24 a ratio of the playback time T of the downloaded block of data segments to the download time R of the block of data segments is determined and compared with a predetermined maximum target ratio or threshold B. The value of B may usually be larger than one and defined such that if the ratio T/R is larger than B, the data transmission quality of the radio frequency connection 14 is high enough to provide a sufficient data buffering for increasing the quality without the risk of a buffer under run and the media stream being stalled. Therefore, if the ratio T/R is larger than the maximum target B, the quality selected from the server for the next block of segments is increased in step 25 and the required playback time T for the next block of data segments to be downloaded is also increased by a factor E in step 26. The factor E may be larger than one and may have a value in the range of 1.1 to 1.5. Therefore, the required playback time T is enlarged continuously as long as the data transmission quality allows this. However, the size of the required playback time T is limited by a buffer capacity BC which is reserved for buffering a block of data segments to be downloaded. Therefore, in step 26 the required playback time T is set to either the increased required playback time T*E or to the buffer capacity BC depending on which value is smaller. Then the method 20 is continued in step 22 by downloading the next block of data segments.

If in step 24 it is determined that the ratio T/R is not larger than the maximum target ratio B, the ratio T/R is compared with a minimum target ratio A. The minimum target ratio A is defined such that a risk for a buffer underload is mitigated.

The value of the minimum target ratio A may also be larger than one but smaller than the minimum target ratio B. If the ratio T/R is lower than the minimum target ratio A (step 27), there may be a high risk of a buffer underload and therefore in step 28 a significantly lower quality D is selected, for example the lowest quality available, and in step 29 the required playback time T for the next block of data segments to be downloaded is set to the predetermined required minimum playback time C. Then, the next block of data segments is downloaded in step 22 based on the quality D and the required playback time T of steps 28 and 29.

In case the ratio T/R is not smaller than the minimum target ratio A as determined in step 27, there is only a small risk of a buffer underload and therefore the quality D for the next block of data segments to be downloaded may remain the same or may be decreased slightly as indicated in step 30. Furthermore, in this case, the required playback time T for the next block of data segments to be downloaded may be decreased by a factor F to mitigate the risk for buffer underload. The factor F may have a value in the range of 0.7 to 0.9, for example preferably a value of 0.9. However, the required playback time T shall not be reduced below the predetermined required minimum playback time C and therefore in step 31 the required playback time T for the next block of data segments is the maximum of the predetermined required minimum playback time C and the playback time of the last block of data segments reduced by the factor F. Then, in step 22 the next block of data segments is downloaded with the updated quality D and required playback time T.

As can be seen from the exemplary embodiment described above, method 20 combines a plurality of functionalities:

First, a risk of buffer underload is mitigated by ensuring that a block of media content segments is selected with a media playback time T at least a factor A longer than the time R used to download the corresponding media segments. Second, a high media stream quality is utilized as far as possible by ensuring that a media stream data rate is increased, if available, when the media playback time T is at least a factor B longer than the time R used to download corresponding media segments. Third, a power consumption efficient usage of the receiver unit 11 is provided. This is ensured by requesting an amount of data per buffer refill which corresponds at least to a certain amount of playback time C. Finally, the method is responsive in the adaption towards radio link variations. The amount of data segments requested a buffer refill is modified based on the variations of the radio data link rate and this adaption may be performed quicker or slower depending on the amount of radio link variations.

Summarizing the functionalities compared to existing solutions, which mainly consider adaption of the media playback data rate towards the varying radio link data rate, the method described above adds a focus towards multisegment download during media buffer refills for reduced receiver power consumption. Although battery consumption depends on very many aspects, for example hardware usage, media format, codecs, radio access technology, distance between mobile device and base station etc., significant energy savings may be provided by the above-described method which may reduce a duty cycle of the receiver unit 11 from around 100% at least down to 50%. With such savings a total smartphone battery energy consumption may be reduced with approximately 20%.

The above-described method 20 is only an example of an implementation and other variants of parts of the method may be implemented, including for example additional parameters, adjusting segment aggregation in more steps and so on, while the core part still should remain to achieve multi segment buffering to reduce power consumption of the receiver unit 11.

The invention claimed is:

1. A method for operating a mobile device, wherein the mobile device is configured to download a media stream comprising a plurality of data segments and to playback the media stream during download, wherein the media stream is downloaded as a plurality of blocks of data segments, each block of data segments comprising a set of the plurality of data segments representing a corresponding media stream portion of the media stream, wherein the method comprises:
   determining a required playback time for a next block of data segments to be downloaded depending on a predetermined required minimum playback time defining a required minimum time duration for playing back the media stream portion provided by the next block of data segments;
   determining a recent playback time of a block of data segments which has been downloaded recently;
   determining the required playback time for the next block of data segments to be downloaded depending on the recent playback time;
   requesting by the mobile device a download of the plurality of blocks of data segments having the required playback time, wherein a gap between a download of the next block of data segments and a download of the block after the next block spans a time period that enables a radio frequency (RF) receiver unit of the mobile device to be powered down during the gap;
   downloading to the mobile device the plurality of blocks of data segments having the required playback time; and
   powering down the RF receiver unit of the mobile device during the gap between the download of the next block of data segments and the download of the block after the next block of data segments.

2. The method according to claim 1, further comprising:
   determining the required minimum playback time based on an inactivity timer value configured for an RF receiver unit of the mobile device performing the download of the media stream, wherein the inactivity timer value controls a transition of the RF receiver unit between a first mode and a second mode, wherein a power consumption of the RF receiver unit in the first mode is higher than in the second mode.

3. The method according to claim 2, wherein the inactivity timer value controls a radio resource control inactivity timer of the RF receiver unit and is configured by a network control layer of a communication network in which the mobile device is operated.

4. The method according to claim 1, further comprising:
   requesting a download of a block of data segments having the determined required playback time.

5. The method according to claim 1, further comprising:
   determining a recent download time required for downloading a block of data segments which has been downloaded recently, and
   determining the required playback time for the next block of data segments to be downloaded depending on the recent download time.

6. The method according to claim 1, wherein determining the required playback time for the next block of data segments to be downloaded comprises:

determining a ratio of the recent playback time to the recent download time, and setting selectively, based on the determined ratio, the required playback time for the next block of data segments to be downloaded to either the predetermined required minimum playback time or to a maximum of the predetermined required minimum playback time and a time derived from a reduction of the recent playback time.

7. The method according to claim 6, wherein at least some of the data segments of the media stream are each available in a plurality of different coding formats, wherein the different coding formats cause different amounts of data to be transferred for downloading the data segment, wherein the method further comprises selecting, for the next block of data segments to be downloaded, a coding format of the available plurality of different coding formats depending on the recent playback time and the recent download time.

8. A mobile device, comprising:

a radio frequency (RF) receiver unit for downloading a plurality of data segments of a media stream, an output device for playing back the media of the downloaded media stream to a user, and a processing device configured to download the media stream and to playback the media stream during download, wherein the media stream is downloaded as a plurality of blocks of data segments, each block of data segments comprising a set of the plurality of data segments representing a corresponding media stream portion of the media stream, and to determine a required playback time for a next block of data segments to be downloaded depending on a predetermined required minimum playback time defining a required minimum time duration for playing back the media stream portion provided by the next block of data segments;

to determine a recent playback time of a block of data segments which has been downloaded recently;

to determine the required playback time for the next block of data segments to be downloaded depending on the recent playback time;

requesting a download of the plurality of blocks of data segments having the required playback time, wherein a gap between a download of the next block of data segments and a download of the block after the next block spans a time period that enables the RF receiver unit of the mobile device to be powered down during the gap;

download to the mobile device the plurality of blocks of data segments having the required playback time; and power down the RF receiver unit during the gap between the download of the next block of data segments and the download of the block after the next block of data segments.

9. The mobile device according to claim 8, wherein the mobile device is configured to determine a required playback time for a next block of data segments to be downloaded depending on a predetermined required minimum playback time defining a required minimum time duration for playing back the media stream portion provided by the next block of data segments.

10. The mobile device according to claim 8, wherein the mobile device comprises at least one device of a group consisting of a mobile telephone, a mobile media player, a mobile computer, and a tablet computer.

* * * * *